United States Patent
McIntosh et al.

[15] 3,652,195
[45] Mar. 28, 1972

[54] THERMOCOUPLE CONTROL SYSTEM

[72] Inventors: Harold A. McIntosh, South Pasadena; Gordon K. Slocum, Downey, both of Calif.; Nick J. Koskolos, St. Louis, Mo.

[73] Assignees: Robertshaw Controls Company, Richmond, Va.; Intertherm, Inc., St. Louis, Mo.

[22] Filed: Dec. 11, 1969

[21] Appl. No.: 884,063

[52] U.S. Cl..............................431/21, 337/404, 337/405, 337/407
[51] Int. Cl.......................................................F23n 5/02
[58] Field of Search ....................431/21; 337/404, 405, 407; 236/21 B

[56] References Cited

UNITED STATES PATENTS

| | | |
|---|---|---|
| 2,273,127 | 2/1942 | McGoldrick et al.....................431/21 |
| 2,533,982 | 12/1950 | Weber et al. ..........................431/21 |
| 2,791,660 | 5/1957 | Sims et al..............................337/405 |
| 2,805,304 | 9/1957 | Smith....................................337/404 |
| 3,304,396 | 2/1967 | Hasson..............................337/407 X |
| 3,433,411 | 3/1969 | Jackson................................236/21 B |

FOREIGN PATENTS OR APPLICATIONS

| | | |
|---|---|---|
| 1,082,774 | 9/1965 | Great Britain........................337/407 |

*Primary Examiner*—Carroll B. Dority, Jr.
*Attorney*—Auzville Jackson, Jr., Robert L. Marben and Anthony A. O'Brien

[57] ABSTRACT

A thermocouple control system including a thermocouple, an operator for a control device and a fusible link assembly connected in series with the thermocouple and the operator, the fusible link assembly assuming an open state upon sensing a predetermined temperature to deenergize the operator by creating an open circuit.

12 Claims, 7 Drawing Figures

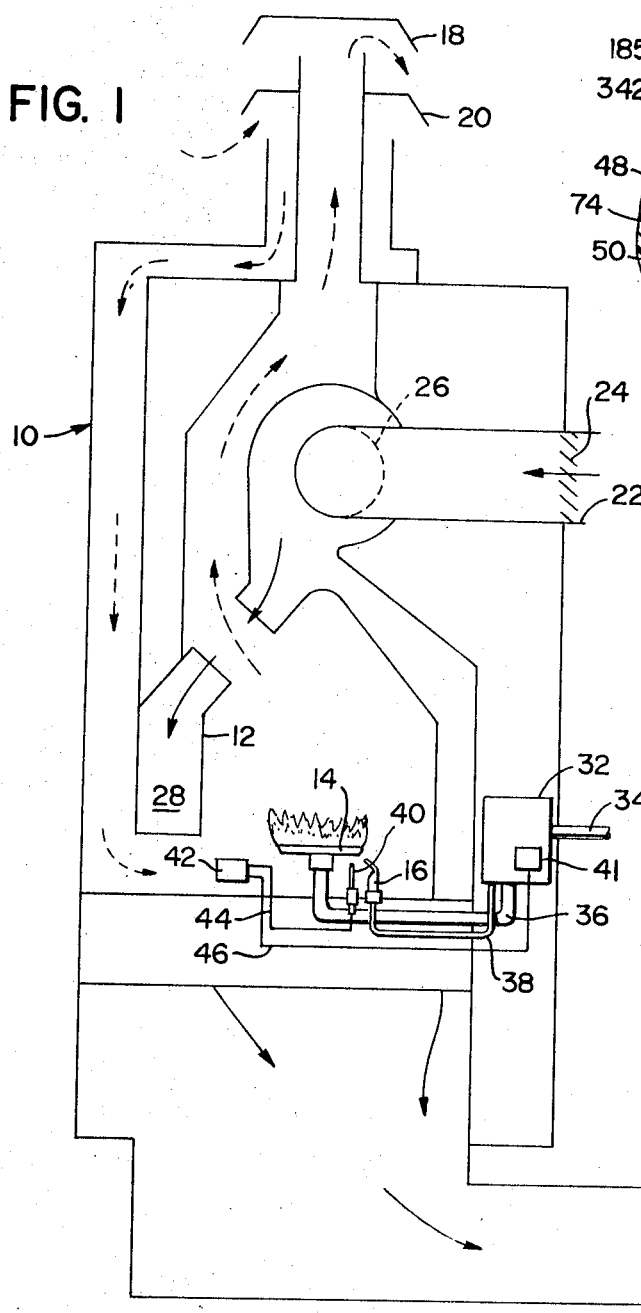
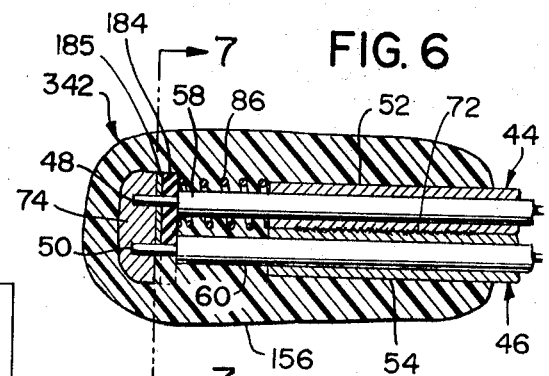
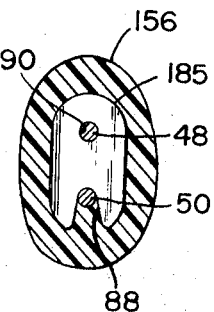
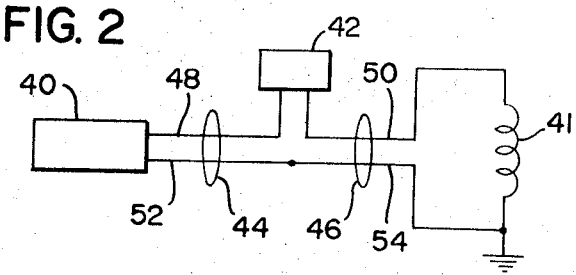
INVENTORS,
Harold A. McIntosh
Gordon K. Slocum
Nick J. Koskolos
BY Anthony A. O'Brien ATTORNEY

THERMOCOUPLE CONTROL SYSTEM

BACKGROUND OF THE INVENTION

1. Field of the Invention

The present invention pertains to fusible link assemblies and more particularly to fusible link assemblies for use in thermocouple control systems.

2. Description of the Prior Art

Thermocouples are frequently utilized as temperature sensors in control systems since they generate thermoelectric currents at specified temperatures. One very common use of thermocouples is to sense a pilot flame at a burner. The thermocouple in one such control system is connected in series with a coil wound around a magnet which controls the position of an armature to control a safety valve. The armature carries a valve member adapted to engage a valve seat when no electricity flows through the coil and to permit flow through the safety valve when the coil is energized by electricity. Thus, as long as a pilot flame is maintained at the burner, the safety valve will be open to permit fuel to flow to the burner; however, if the pilot flame is extinguished for any reason, the thermocouple will cease generating electricity to thereby deenergize the coil and release the armature to close the safety valve and stop the flow of fuel to the burner.

Since conventional thermocouple control systems normally operate a control device which is operable to prevent burner operation, it is desirable to connect switches responsive to predetermined conditions other than pilot flame failures in series in the thermocouple circuits; however, the extremely limited power generated by thermocouples has presented a substantial obstacle to the addition of further components to thermocouple circuits since the added resistance of the components can overpower the thermocouple.

U.S. Pat. Nos. 2,767,355 to Wolff, 2,781,977 to Stanley et al., 2,987,919 to Kirby and 3,433,411 to Jackson are illustrative of prior art switches designed for use in thermocouple circuits to provide control of a burner in accordance with predetermined conditions, such as high limit temperatures, as well as pilot flame outage. These switches, however, have the disadvantages of being relatively expensive and complex.

SUMMARY OF THE INVENTION

It is an object of the present invention to utilize a fusible link assembly in series with a thermocouple to control a safety device.

Another object of the present invention is to utilize a thermocouple to sense a flame at a burner and to connect a fusible link assembly responsive to high limit temperature in series with the thermocouple.

A further object of the present invention is to utilize bias means to assure electrical interruption after melting of a fusible link.

The present invention has another object in that a washer having a conductive surface thereon is used to connect a pair of conductors and to wipe off excess fusible material after melting of a fusible link.

Some of the advantages of the present invention over the prior art are that the fusible link assemblies are inexpensive to manufacture and reliable in operation, that electrical interruption by the fusible link assemblies is assured, that the fusible link assemblies are of small size and easily installed, and that a single control device may be utilized to protect against high limit temperatures as well as pilot flame outage.

The present invention is generally characterized in a thermocouple control system including a thermocouple, an operator for a safety device and a fusible link assembly connected in series whereby the operator is energized by electrical current generated by the thermocouple when the fusible link assembly is closed and the operator is deenergized when either the thermocouple is not operable to generate an electrical current or the fusible link assembly is opened in response to a predetermined temperature.

Further objects and advantages of the present invention will become apparent from the following description of the preferred embodiments taken in conjunction with the accompanying drawings.

BRIEF DESCRIPTION OF THE DRAWINGS

FIG. 1 is a schematic diagram of a thermocouple control system according to the present invention for use with a furnace.

FIG. 2 is a simplified schematic diagram of the thermocouple control system of FIG. 1.

FIGS. 3, 4, 5, and 6 are side elevations of various embodiments of fusible link assemblies according to the present invention for use with the thermocouple control system of FIG. 1.

FIG. 7 is an end view of the fusible link assembly of FIG. 6.

DESCRIPTION OF THE PREFERRED EMBODIMENTS

Figure 3:
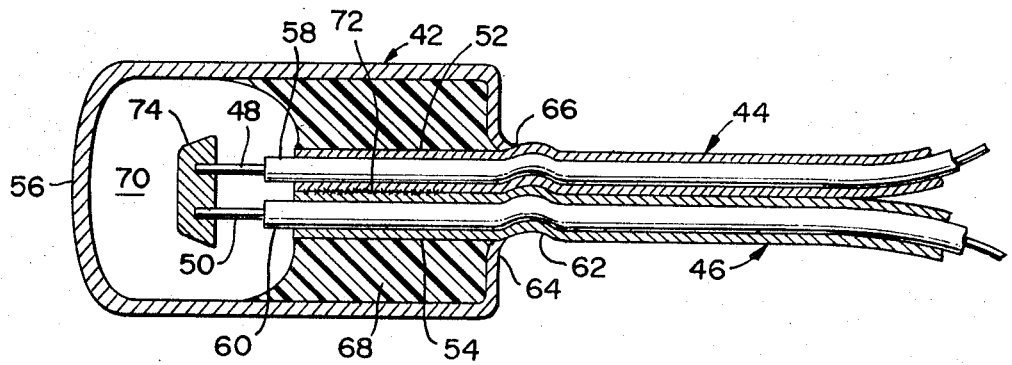

A thermocouple control system according to the present invention is illustrated in FIG. 1 for use with a furnace; however, the control system of the present invention may be utilized with any suitable apparatus and the furnace use is illustrative only.

The furnace, indicated generally at 10, has a burner box 12 in which are disposed a main burner 14 and a pilot burner 16. A flue opening 18 communicates with burner box 12 to vent the products of combustion to the atmosphere, and an opening 20 communicates with burner box 12 to introduce combustion air thereto. Air is drawn into a return air conduit 22 and through an air filter 24 by a blower 26 which forces the air through a plenum chamber 28 into a warm air conduit 30 leading to a space to be heated.

A control device 32 is fixed within furnace 10 and includes valve means for controlling a flow of fuel from a supply conduit 34 to main burner 14 and pilot burner 16 through a main conduit 36 and a pilot conduit 38, respectively. Pilot burner 16 is disposed in igniting proximity to main burner 14, and a thermocouple 40 is disposed adjacent pilot burner 16 to sense a pilot flame emanating therefrom.

A fusible link assembly 42 is disposed below main burner 14 and to the side from which combustion air enters burner box 12, and fusible link assembly 42 is electrically connected with thermocouple 40 and an operator 41 in control device 32 by coaxial leads 44 and 46, respectively. As is conventional in thermoelectric systems the operator 41 operates a safety valve in response to deenergization of its electromagnet. The current generated by the thermocouple 40 is great enough to hold an armature of the electromagnet in its valve open position but is not great enough to attract the armature, so manual reset means (not shown) is utilized to move the armature against the core of the electromagnet. The operator 41 is in series with thermocouple 40 and fusible link assembly 42 through leads 44 and 46 (FIG. 2). Coaxial leads 44 and 46 each have inner conductors 48 and 50 and outer conductors 52 and 54 and as illustrated in FIG. 2, inner conductors 48 and 50 are connected at fusible link assembly 42. Outer conductors 52 and 54 act as a reference or ground such that fusible link assembly 42 and operator 41 are in series with thermocouple 40.

In operation, a main valve in control device 32 is opened when there is a demand for heat; and, after a flame has been established at pilot burner 16, fuel will be continuously supplied to main burner 14 during heat demand unless the pilot flame is extinguished. If the pilot flame is extinguished, the temperature to which thermocouple 40 is subjected will be decreased; and, accordingly, the electricity generated by thermocouple 40 ceases thereby deenergizing the operator 41 and closing the safety valve to prevent further flow of fuel to main burner 14.

If for any reason flue 18 should become blocked or if unusual wind conditions occur to reverse the flow of air through flue 18 during furnace operation, extremely dangerous conditions are created due to the undesirable amount of heat which will build up in the lower portion of furnace 10. One characteristic of such conditions is that the flames at main burner 14 will flare and tend to flow out of the opening where combustion air normally enters burner box 12. Fusible link assembly 42 will, therefore, be subjected to increased ambient temperatures from the main burner flames and will fuse or melt at a predetermined temperature associated with such conditions to open the thermocouple circuit and close the safety valve in the same manner as previously described with respect to pilot flame outage.

A first embodiment of the fusible link assembly 42 for use with the system of FIG. 1 is illustrated in FIG. 3 and includes a housing 56 made of a metal or high temperature plastic. Coaxial leads 44 and 46 extend into the center of housing 56, and the leads are cut such that inner conductors 48 and 50 extend from insulation sheathes 58 and 60 which in turn extend from outer conductors 52 and 54 in leads 44 and 46, respectively. Leads 44 and 46 are crimped at 62 in order to prevent undesired movement thereof and accidental disassembly. Housing 56 has an end wall 64 with an outwardly flared aperture 66 therein for receiving leads 44 and 46 and abutting the crimped portions 62 thereof. The end of housing 56 adjacent wall 64 is filled with a sealant 68 such that an open interior chamber 70 is provided into which inner conductors 48 and 50 extend.

Outer conductors 52 and 54 are electrically connected within housing 56 by soldering, as indicated at 72. The ends of inner conductors 48 and 50 are dipped in a mold of a fusible material, such as solder; and after the fusible material has solidified into a fusible link 74 between inner conductors 48 and 50, leads 44 and 46 are then assembled in housing 56. Fusible link 74 may have any desired shape in accordance with the mold utilized. The fusible material utilized is dependent upon the temperature at which it is desired that fusible link 74 melts to disconnect inner conductors 48 and 50.

In operation, the outer conductors 52 and 54 act as a reference or ground, as previously mentioned, such that the electrical current generated by thermocouple 40 passes from one terminal of thermocouple 40 through inner conductor 48, fusible link 74, inner conductor 50, and the operator 41 in control device 32, such as the coil for a magnet, to outer conductors 52 and 54 which are connected with the other terminal of thermocouple 40, as shown schematically in FIG. 2.

If a high limit temperature condition exists, such as that previously described with respect to reverse flow in flue 18 in furnace 10, link 74 will fuse or melt and drop from inner conductors 48 and 50 to disconnect them and deenergize operator 41 to shut down the system. By forming chamber 70 with adequate dimensions and extending insulation sheathes 58 and 60 sufficiently into chamber 70, the fusible material will always drop from inner conductors 48 and 50 to a position such that inadvertent connection of inner conductors 48 and 50 is prevented.

Figure 4:
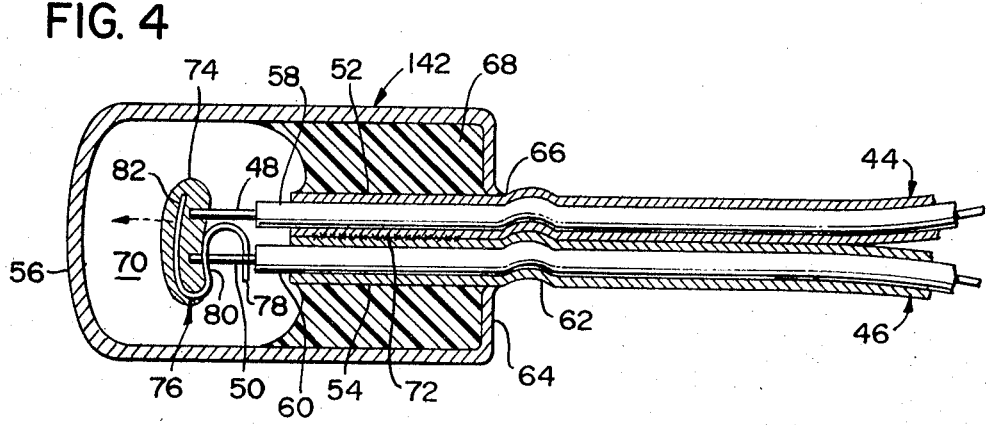

Another embodiment of a fusible link assembly for use with the system of FIG. 1 is illustrated in FIG. 4 and is indicated generally at 142. The primary difference between the fusible link assembly 142 of FIG. 4 and the fusible link assembly 42 of FIG. 3 is that a flat blade spring 76 is utilized in FIG. 4 to assure that the electrical connection between inner conductors 48 and 50 will be broken once the link 74 fuses or melts. Accordingly, identical reference numbers are utilized to indicate parts in FIG. 4 identical to parts in FIG. 3, which identical parts are not described again.

Flat blade spring 76 is generally S-shaped with a first end 78 and a parallel portion 80 inserted in parallel apertures in inner conductor 50. A tension end 82 of spring 76 is bent to a position adjacent the end of inner conductor 48; and, with spring 76 in this position, the ends of inner conductors 48 and 50 along with spring 76 are dipped in a fusible material which is permitted to solidify and retain tension end 82 of spring 76 in the bias position illustrated.

The operation of the fusible link assembly of FIG. 4 is the same as that previously described with respect to FIG. 3; however, once link 74 fuses or melts tension end 82 of spring 76 will return to its normal position by rotating counterclockwise to thereby assure electrical interruption of the thermocouple circuit.

Figure 5:
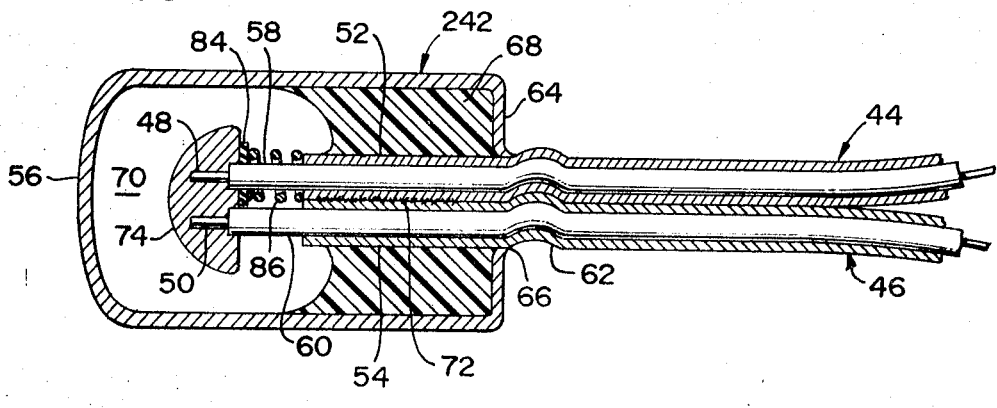

A further embodiment of a fusible link assembly for use with the system of FIG. 1 is illustrated in FIG. 5 and is indicated generally at 242. Those parts of the fusible link assembly of FIG. 5 which are identical to parts of the fusible link assembly of FIG. 3 are given identical reference numbers and are not described again.

The major difference between fusible link assembly 242 of FIG. 5 and fusible link assembly 42 of FIG. 3 is that a washer 84 and a spring 86 are utilized to assure electrical interruption once link 74 fuses or melts. Washer 84 is annular with a bore essentially the same as the diameter of insulation sheath 58 and is made of an electrically non-conductive material. Spring 86 is coiled around insulation sheath 58 and mounted in compression between washer 84 and the end of outer conductor 52. Washer 84 is forced onto insulation sheath 58 to compress spring 86, and the ends of inner conductors 48 and 50 along with washer 84 are then dipped into a mold of fusible material which is permitted to solidify to form fusible link 74 which retains washer 84 in the position illustrated.

The operation of the fusible link assembly of FIG. 5 is the same as that previously described with respect to the fusible link assembly of FIG. 3; however, once link 74 fuses or melts, the bias from spring 86 forces washer 84 off insulation sheath 58 and inner conductor 48 to wipe off any excess fusible material on inner conductor 50 to thereby assure electrical interruption.

Another fusible link assembly is illustrated in FIG. 6 and is indicated generally at 342. Fusible link assembly 342 may be utilized with the system of FIG. 1 in the same manner as previously described with respect to the fusible link assembly of FIG. 5. Those parts of the fusible link assembly 342 of FIG. 6 which are identical to parts of fusible link assembly 242 of FIG. 5 are given identical reference numbers and are not described again. Parts similar to those of FIG. 5 are given reference numbers with 100 added.

The primary differences between the fusible link assembly of FIG. 6 and the fusible link assembly of FIG. 5 are that a washer 184 is utilized having an electrically conductive surface 185 thereon and the assembly is encapsulated in a resinous plastic material 156. Washer 184 has a generally ovate shape with a wedge 88 cut from the bottom thereof to accomodate inner conductor 48 and an aperture 90 in the top thereof to accomodate inner conductor 50, as may be seen from FIG. 7. Washer 184 is constructed of copper-clad printed circuit board such that the washer 184 is utilized to connect inner conductors 48 and 50. In assembly, washer 184 is forced over inner conductors 48 and 50 to compress spring 86, and the ends of inner conductors 48 and 50 along with washer 184 are then dipped in a fusible material and permitted to solidify to hold washer 184 in the position illustrated with spring 86 in compression. The entire assembly is then dipped in the resinous plastic material 156 which is permitted to harden.

The encapsulation 156 has a melting temperature above normal operating temperatures such that when the temperature sensed by fusible link assembly 342 approaches the melting or fusing temperature of the link 74, the encapsulation melts very quickly and does not interfere with electrical interruption of the thermocouple circuit. Once encapsulation 156 has melted the fusible link assembly 342 responds in the same manner as previously described with respect to the embodiment of FIG. 5. That is, compressed spring 86 forces washer 184 off inner conductors 48 and 50 so as to wipe any excess fusible material therefrom. The wedge 88 cut from washer 184 prevents any sticking of washer 184 after fusion of link 74 due to the uneven force from spring 86.

One distinct advantage of the embodiment of FIG. 6 is that only a minimum amount of fusible material need be utilized to form fusible link 74 since conduction between inner conductors 48 and 50 is completed through the conductive copper surface on washer 184. The extension of spring 86 is, of course, great enough such that washer 184 is removed completely from inner conductors 48 and 50 to prevent inadvertent electrical connection therebetween.

The encapsulation in a resinous plastic material shown in the embodiment of FIG. 6 may be used with the fusible link assemblies of FIGS. 3, 4 and 5 and greatly reduces manufacturing cost while increasing reliability since once the encapsulation melts the fusible material of the link is free to drop completely away from inner conductors 48 and 50.

The thermocouple control system of the present invention permits the use of a second responsive means with a thermocouple since the resistance of fusible links is so low as not to adversely affect operation of the thermocouple circuit. The bias springs shown in FIGS. 4, 5, and 6 are advantageous in that they assure electrical interruption once the link has fused or melted.

In as much as the present invention is subject to many variations, modifications and changes in detail, it is intended that all matter contained in the foregoing description or shown in the accompanying drawings shall be interpreted as illustrative and not in a limiting sense.

What is claimed is:

1. A thermocouple control system comprising
   thermocouple means adapted to generate an electrical current in response to temperature,
   an operator adapted to control a safety device and having energized and deenergized states,
   fusible link means including a mass of fusible material and having a normally closed state and an open state in response to a predetermined temperature,
   circuit means connecting said fusible link means in series with said thermocouple means and said operator whereby said operator is in its energized state in response to electrical current generated by said thermocouple means when said fusible link means is in its closed state and whereby said operator is in its deenergized state when either said thermocouple means is inoperative or said fusible link means is in its open state,
   said circuit means having first and second conductors connected by said mass of fusible material with said first conductor being connected to said thermocouple means and said second conductor being connected to said operator, and
   spring bias means in said fusible link means having contracted and expanded positions, said spring bias means being retained in its contracted position by said mass of fusible material at temperatures below said predetermined temperature and being released to its expanded position by said mass of fusible material at said predetermined temperature,
   said spring bias means applying a force on said mass of fusible material and displacing the same from at least one of said first and second conductors when said predetermined temperature is reached to assure electrical interruption upon melting of the mass of fusible material.

2. A thermocouple control system comprising
   thermocouple means generating an electrical current in response to temperature;
   an operator adapted to control a safety device, said operator having an energized state and a deenergized state;
   fusible link means having a normally closed state and being responsive to a predetermined temperature to assume an open state;
   circuit means connecting said fusible link means in series with said thermocouple means and said operator whereby said operator is in said energized state in response to said electrical current generated by said thermocouple means when said fusible link means is in said closed state and said operator is in said deenergized state when either said thermocouple means is not operable to generate electrical current or said fusible link means is in said open state in response to said predetermined temperature;
   said circuit means including a first conductor connected with said thermocouple means and said fusible link means, and a second conductor connected with said operator and said fusible link means; and
   said fusible link means including a mass of fusible material connecting said first conductor with said second conductor, a washer disposed on one of said first and second conductors and held in place by said mass of fusible material, and bias means applying a force to said mass of fusible material to assure electrical interruption upon melting thereof, said bias means including a spring coiled in compression around said one conductor and abutting said washer whereby said spring forces said washer off said one conductor after said mass of fusible material melts.

3. A thermocouple control system comprising
   thermocouple means generating an electrical current in response to temperature;
   an operator adapted to control a safety device, said operator having an energized state and a deenergized state;
   fusible link means having a normally closed state and being responsive to a predetermined temperature to assume on open state;
   circuit means connecting said fusible link means in series with said thermocouple means and said operator whereby said operator is in said energized state in response to said electrical current generated by said thermocouple means when said fusible link means is in said closed state and said operator is in said deenergized state when either said thermocouple means is not operable to generate electrical current or said fusible link means is in said open state in response to said predetermined temperature;
   said circuit means including a first conductor connected with said thermocouple means and said fusible link means, and a second conductor connected with said operator and said fusible link means; and
   said fusible link means including a mass of fusible material connecting said first conductor with said second conductor, a washer engaging said first and second conductors and made of an insulating material, said washer having a conductive surface electrically connecting said first and second conductors, and bias means applying a force to said mass of fusible material to assure electrical interruption upon melting thereof, said bias means including a spring coiled in compression around said one conductor and abutting said washer whereby said spring forces said washer out of engagement with said first and second conductors after said mass of fusible material melts.

4. The invention as recited in claim 1 wherein said bias means is a flat blade spring secured to one of said first and second conductors and having bent portion in contact with the other of said first and second conductors, said bent portion being held in place by said mass of fusible material whereby said bent portion moves away from said other conductor after said mass of fusible material melts to assure electrical interruption.

5. The invention as recited in claim 1 wherein said fusible link means includes a housing for said mass of fusible material, said housing having a chamber for receiving said mass of fusible material after melting.

6. The invention as recited in claim 1 wherein said fusible link means is encapsulated in a resinous plastic material.

7. In a control system for a burner, the combination comprising
   a thermocouple disposed adjacent the burner to sense a flame threat and generate an electrical current in response to the flame;
   a control device for controlling a flow of fuel to the burner including an electrical operator, said electrical operator having an energized state to permit fuel flow through said control device to the burner and a deenergized state preventing fuel flow to the burner;
   a fusible link assembly having a normally closed state and responsive to a predetermined temperature to assume an open state;

circuit means connecting said fusible link assembly in series with said thermocouple and said electrical operator whereby said electrical current from said thermocouple places said electrical operator in said energized state when said thermocouple senses a flame at the burner and said fusible link assembly is in said closed state, and said electrical operator is in said deenergized state when either said thermocouple does not sense a flame or said fusible link assembly is in said open state in response to said predetermined temperature;

said circuit means including a first conductor connected with said thermocouple and said fusible link assembly and a second conductor connected with said electrical operator and said fusible link assembly, and said fusible link assembly including a mass of fusible material connecting said first conductor with said second conductor and bias means applying a force to said mass of fusible material to assure electrical interruption upon melting of said fusible material; and said circuit means having a third conductor coaxial with said first conductor and spaced therefrom by a first insulation sheath, a fourth conductor coaxial with said second conductor and spaced therefrom by a second insulation sheath, and said fusible link assembly having means connecting said third conductor with said fourth conductor.

8. The invention as recited in claim 7 wherein said fusible link assembly includes a housing for said mass of fusible material, said housing having an interior chamber for receiving said mass of fusible material after melting.

9. The invention as recited in claim 8 wherein said first and second conductors are crimped adjacent said fusible link assembly.

10. The invention as recited in claim 7 wherein said fusible link assembly is encapsulated in a resinous plastic material.

11. In a control system for a burner, the combination comprising a thermocouple disposed adjacent the burner to sense a flame thereat and generate an electrical current in response to the flame;

a control device for controlling a flow of fuel to the burner including an electrical operator, said electrical operator having an energized state to permit fuel flow through said control device to the burner and a deenergized state preventing fuel flow to the burner;

a fusible link assembly having a normally closed state and responsive to a predetermined temperature to assume an open state;

circuit means connecting said fusible link assembly in series with said thermocouple and said electrical operator whereby said electrical current from said thermocouple places said electrical operator in said energized state when said thermocouple senses a flame at the burner and said fusible link assembly is in said closed state, and said electrical operator is in said deenergized state when either said thermocouple does not sense a flame or said fusible link assembly is in said open state in response to said predetermined temperature;

said circuit means including a first conductor connected with said thermocouple and said fusible link assembly, and a second conductor connected with said electrical operator and said fusible link assembly, and said fusible link assembly including a mass of fusible material connecting said first conductor with said second conductor and bias means applying a force to said mass of fusible material to assure electrical interruption upon melting of said fusible material; and said fusible link assembly including a washer disposed on one of said first and second conductors and held in place by said mass of fusible material, and said bias means comprising a spring coiled in compression around said one conductor and abutting said washer whereby said spring forces said washer off said one conductor to wipe excess fusible material from said one conductor after said mass of fusible material melts.

12. In a control system for a burner, the combination comprising a thermocouple disposed adjacent the burner to sense a flame thereat and generate an electrical current in response to the flame;

a control device for controlling a flow of fuel to the burner including an electrical operator, said electrical operator having an energized state to permit fuel flow through said control device to the burner and a deenergized state preventing fuel flow to the burner;

a fusible link assembly having a normally closed state and responsive to a predetermined temperature to assume an open state;

circuit means connecting said fusible link assembly in series with said thermocouple and said electrical operator whereby said electrical current from said thermocouple places said electrical operator in said energized state when said thermocouple senses a flame at the burner and said fusible link assembly is in said closed state, and said electrical operator is in said deenergized state when either said thermocouple does not sense a flame or said fusible link assembly is in said open state in response to said predetermined temperature;

said circuit means including a first conductor connected with said thermocouple and said fusible link assembly, and a second conductor connected with said electrical operator and said fusible link assembly, and said fusible link assembly including a mass of fusible material connecting said first conductor with said second conductor and bias means applying a force to said mass of fusible material to assure electrical interruption upon melting of said fusible material; and said fusible link assembly including a washer engaging said first and second conductors and made of an insulating material, said washer having a conductive surface electrically connecting said first and second conductors, and said bias means being a spring coiled in compression around one of said first and second conductors and abutting said washer whereby said spring forces said washer out of engagement with said first and second conductors after said mass of fusible material melts.

* * * * *